United States Patent [19]

Yamamoto

[11] Patent Number: 5,747,934
[45] Date of Patent: May 5, 1998

[54] LIGHTING SWITCH ASSEMBLY WITH INTERNAL DAYTIME RUNNING LIGHT CONTROL CIRCUIT

[75] Inventor: Harushige Yamamoto, Tokyo, Japan

[73] Assignee: Niles Parts Co., Ltd., Japan

[21] Appl. No.: 698,856

[22] Filed: Aug. 16, 1996

[30] Foreign Application Priority Data

Dec. 28, 1995 [JP] Japan ................................. 7-353046

[51] Int. Cl.⁶ ................................................. B60Q 1/02
[52] U.S. Cl. ................................ 315/82; 315/83; 315/80; 307/10.8; 362/802; 362/61
[58] Field of Search ................................ 315/82, 83, 80, 315/77, 291, 307; 307/10.1, 10.8; 362/61, 802; 340/468, 469

[56] References Cited

U.S. PATENT DOCUMENTS

| | | | |
|---|---|---|---|
| 4,684,819 | 8/1987 | Haag et al. | 315/83 X |
| 4,928,036 | 5/1990 | Abboud | 315/82 |
| 4,934,769 | 6/1990 | Kurozu et al. | 315/83 |
| 4,965,461 | 10/1990 | McRoberts, Jr. et al. | 315/83 X |
| 5,081,565 | 1/1992 | Nabha et al. | 315/82 X |
| 5,245,251 | 9/1993 | Irick | 315/82 |

FOREIGN PATENT DOCUMENTS 162142  4/1989  Japan.

*Primary Examiner*—Robert Pascal
*Assistant Examiner*—Haissa Philogene
*Attorney, Agent, or Firm*—Ronald P. Kananen

[57] ABSTRACT

A lighting switch assembly with an internal daytime running light control circuit, comprising a printed circuit board 15 mounted to a lighting switch assembly A, and electric elements 16 soldered to the printed circuit board 15 to form a daytime running light control circuit. The electric elements 16 are connected to fixed contacts 20 through terminals 18. A voltage regulator and an ignition switch with an engine start contact are both connected to the lighting switch assembly A. This construction eliminates the need for wires to provide an electrical connection between a daytime running light control circuit and a lighting switch assembly and, thus, simplifies the wiring arrangement of the vehicle. The arrangement also reduces the total weight of wires connected to a headlamp and eliminates the step of mounting the daytime running light control circuit to the vehicle.

13 Claims, 3 Drawing Sheets

LIGHTING SWITCH ASSEMBLY WITH INTERNAL DAYTIME RUNNING LIGHT CONTROL CIRCUIT

BACKGROUND OF THE INVENTION

1. Field of the Invention

This invention relates to a so-called daytime running light control circuit designed to cause the headlamp of a motor vehicle or motorcycle to be constantly lighted during daytime or before evening to advise the occupants of other vehicles of the existence of that vehicle or motorcycle. More particularly, this invention provides a lighting switch assembly with an internal daytime running light control circuit.

2. Description of the Prior Art

The headlight of a motor vehicle or motorcycle is constantly lighted during daytime or before evening so as to positively advise the occupants of other vehicles of the existence of that vehicle or motorcycle. This brings about a reduction in the number of traffic accidents, as is clear from surveys carried out in the United States or other countries. For those countries which have nights with the midnight sun during summer, it is also necessary to constantly light the headlamp of a vehicle. To this end, there has been provided a daytime running light control circuit as shown, for example, in Japanese Laid-Open Utility Model Publication No. Hei 1-62142.

A conventional daytime running light control circuit is typically formed as an independent unit. A number of wires are required to provide an electrical connection between such a daytime running light control circuit or unit and a lighting switch assembly. This complicates the wiring arrangement of a vehicle. Those wires that are connected to the headlamp must have a larger diameter since a substantial amount of current flows therethrough. The total weight of the wires increases if a number of large diameter wires are used to connect the unit to the lighting switch assembly. Typically, the daytime running light control circuit and the light switch assembly are separately mounted to the vehicle. This results in an increase in the number of assembly steps.

SUMMARY OF THE INVENTION

In order to overcome the above problems, it is a first object of this invention to eliminate the need for wires to provide an electrical connection between a daytime running light control circuit and a lighting switch assembly.

It is a second object of this invention to reduce the total weight of wires connected to a headlamp of a vehicle having daytime running light control.

It is a third object of this invention to eliminate the step of mounting the daytime running light control circuit to a vehicle.

Additional objects, advantages and novel features of the invention will be set forth in part in the description that follows, and in part will become apparent to those skilled in the art upon examination of the following or may be learned by practice of the invention. The objects and advantages of the invention are realized and attained by means of the instrumentalities and combinations particularly pointed out in the appended claims.

In order to solve the aforementioned problems, according to the present invention, there is provided a lighting switch assembly with an internal daytime running light control circuit, which comprises a lighting switch assembly having on-off switches connected to a headlamp, a printed circuit board mounted to the lighting switch assembly, and electric elements mounted to the printed circuit board and adapted to form daytime running light control circuits, wherein the electric elements are directly connected to the on-off switches.

The lighting switch assembly with an internal daytime running light control circuit, according to the present invention, is releasably attached to the base of combination switches, which is attached to a vehicle steering column. A voltage regulator is preferably connected to the lighting switch assembly and adapted to produce a voltage as a vehicle engine is rotated. An ignition switch having an engine start contact connected to the lighting switch assembly is also provided.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A preferred embodiment of the present invention will be described in detail hereinafter with reference to FIGS. 1 to 3.

Figure 1:
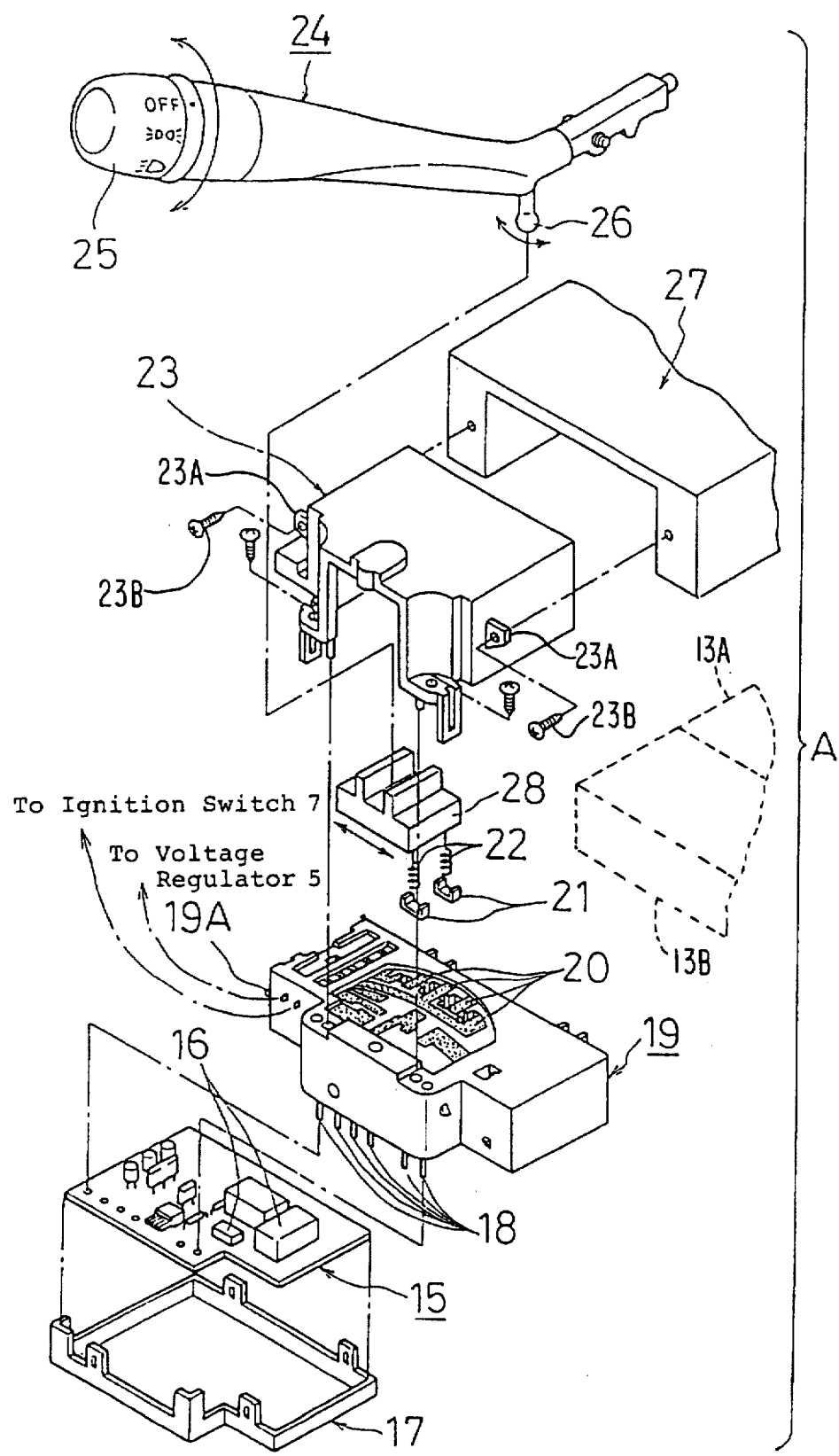
FIG. 1 is an exploded perspective view of a lighting switch assembly according to a preferred embodiment of the present invention.

FIG. 1 is an exploded perspective view of a lighting switch assembly A made according to a preferred embodiment of the present invention. The lighting switch assembly A includes daytime running light control circuits 3 and 13 (FIGS. 2 and 3, respectively). In the illustrated embodiment, the lighting switch assembly A also has a wiper switch assembly 13A, shown schematically, and a turn indicator switch assembly 13B, shown schematically, and is releasably attached to a base 27 of combination switches. Ears 23A on sides of a switch cover 23 have apertures which align with corresponding apertures in the base 27. The switch cover 23 is releasably attached to the base 27 by screws 23B holding the ears 23A to the base. The base 27 of the combination switches is, in turn, attached to a vehicle steering column.

The lighting switch assembly A includes a printed circuit board 15. More specifically, the printed circuit board 15 includes an electrically conductive line (not shown) made from a copper film, and various electric elements 16 soldered to the electrically conductive line to thereby form a daytime running light control circuit 3, as shown in FIG. 2, and a daytime running light control circuit 13, as shown in FIG. 3. The daytime running light control circuits 3, 13 will be described in more detail below.

The lighting switch assembly A also includes on-off switches 4, 14. The on-off switches 4, 14 are composed of fixed contacts 20 and movable contacts 21.

The fixed contacts 20 are insert molded into a five-switch block 19. The fixed contacts 20 are integrally formed, at their one ends, with a plurality of terminals 18. The terminals 18 are soldered to the electrically conductive line of the printed circuit board 15 to provide an electrical connection between the daytime running light control circuits 3, 13 and the fixed contacts 20. The fixed contacts 20 are also connected to terminals (not shown) of a connector 19A which is, in turn, mounted to the switch block 19. The connector 19A is connected to a connector (not shown), which is mounted to the body of a vehicle, to provide a connection between the fixed contacts 20 of the on-off switches 4, 14 and headlamps 1, and also between the printed circuit board 15 and an ignition switch 7 and a voltage regulator 5.

The movable contacts 21 are operatively associated with the fixed contacts 20. The movable contacts 21 are attached to a slider 28. A knob 25 is connected to the leading end of a control lever 24. A movable element 26 is rotated with the knob 25 to move the slider 28. This causes the movable contacts 21 to slide on the fixed contacts 20.

To protect the assembly, a cover 17 is attached to the rear side of the printed circuit board 15. The electric elements 16, which are mounted to the front side of the printed circuit board 15, are protected or contained within a space defined in the lower part of the switch block 19. Also, the fixed contacts 20 are covered by the switch cover 23 which is, in turn, resiliently fit over the switch block 19. The movable contacts 21 are urged into contact with the fixed contacts under the influence of springs 22.

The lighting switch assembly A is releasably attached to the base 27 of the combination switches which are, in turn, mounted to the vehicle steering column.

The daytime running light control circuits 3, 13, which are formed on the printed circuit board 15, may take various forms, but two different forms of circuits will be described herein.

Figure 2:
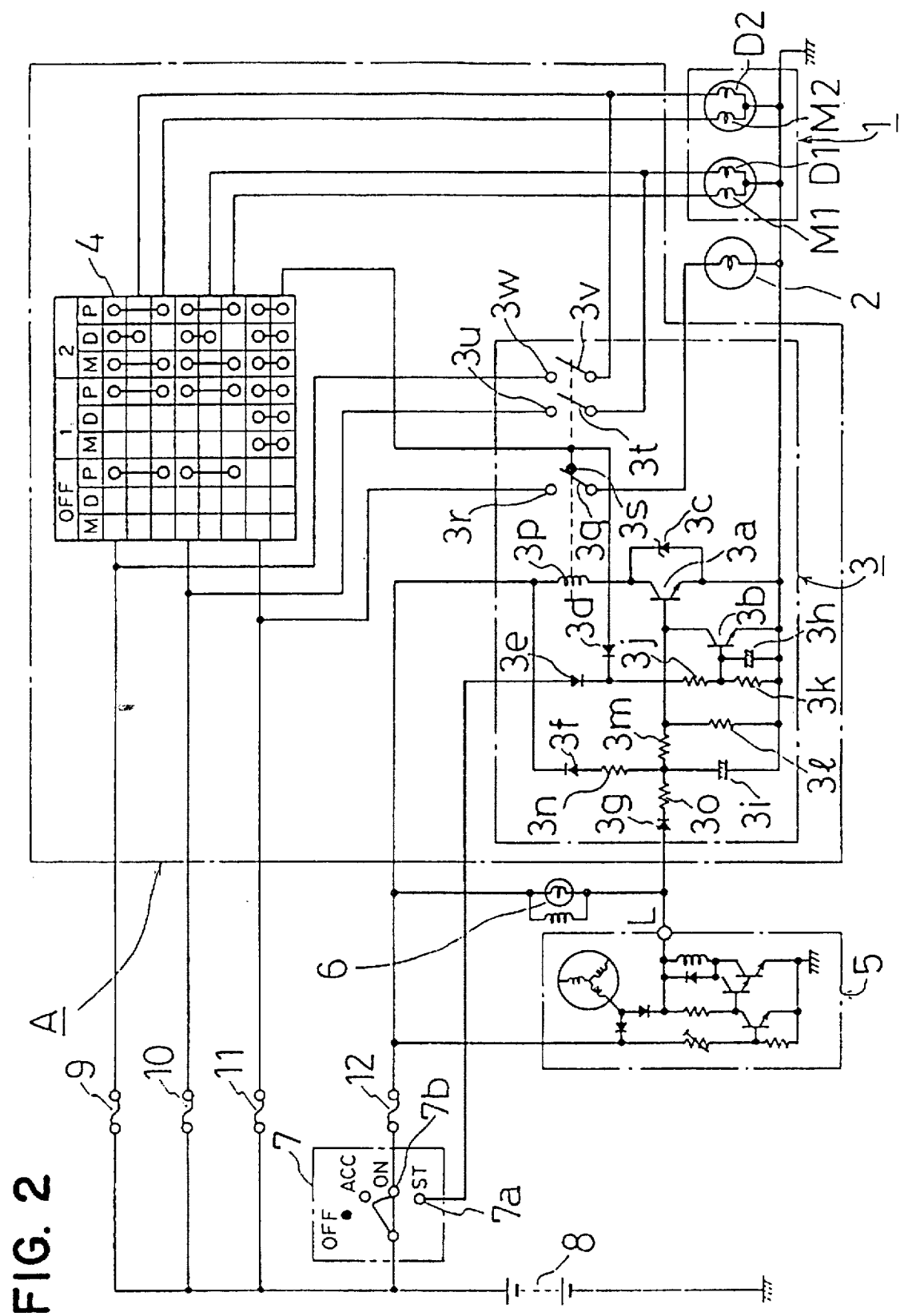
FIG. 2 is a diagram showing a first form of daytime running light control circuit formed in a printed circuit board shown in FIG. 1.

Reference will first be made to the daytime running light control circuit 3, as shown in FIG. 2. This first circuit is of the type which allows the headlamps 1 to be lighted with the same degree of brightness regardless of whether a vehicle is running during the daytime or the nighttime. The daytime running light control circuit 3 is composed of transistors 3a, 3b, a Zener diode 3c, diodes 3d to 3g, capacitors 3h, 3i, resistors 3j to 3o, a relay coil 3p, movable contacts 3q, 3t, 3v, normally open contacts 3r, 3u, 3w, and a normally closed contact 3s.

The diode 3e has an anode connected to an engine start contact 7a of the ignition switch 7. The diode 3g has an anode connected to an L terminal or a point where a charge lamp 6 and the voltage regulator 5 are interconnected. The relay coil 3p is connected to an ON contact 7b of the ignition switch 7 through a fuse 12. The normally open contacts 3r, 3u, 3w are respectively connected to fuses 11, 10, 9 located upstream of the on-off switch 4. The normally closed contact 3s is connected to a point where the on-off switch 4 and the anode of the diode 3d are interconnected. The movable contact 3q is connected to a small lamp 2. The movable contact 3t is connected to a point where the on-off switch 4 and a first dimmer lamp D1 of the headlamp 1 are interconnected. The movable contact 3v is connected to a point where the on-off switch 4 and a second dimmer lamp D2 are interconnected. The headlamp 1 has a first main lamp M1 and a second main lamp M2, which are connected to the on-off switch 4. The ignition switch 7 and the fuses 9, 10, 11 are connected to the positive terminal of a direct current power source 8.

The first circuit, as shown in FIG. 2, operates as follows.

Reference will first be made to the state in which the on-off switch 4 is OFF. To start the vehicle engine, the ignition switch 7 is moved from an OFF position to a start position. This causes a self starter or motor (not shown) to rotate. At this time, a base current is caused to flow from the engine start contact 7a of the ignition switch 7 to the transistor 3b of the daytime running light control circuit 3 so as to render the transistor 3b on and the transistor 3a off. As a result, no exiting current flows through the relay coil 3p, and the movable contacts 3q, 3t, 3v will in no way be connected to the normally open contacts 3r, 3u, 3w, respectively.

When the ignition switch 7 is moved to the start position, the headlamp 1 will not be turned on. The energy generated by the direct current power source 8 is used exclusively to rotate the self starter.

Next, the ignition switch 7 is returned to the ON position after the engine starts. The transistor 3b is rendered OFF since the base current is no longer supplied from the engine start contact 7a of the ignition switch 7. The transistor 3a is now free to operate. At this time, the voltage regulator 5 is operable to give a high level of electric potential to the L terminal during starting of the engine. A base current then flows from the L terminal to the transistor 3a. As a result, the transistor 3a is rendered ON to cause an exiting current to flow through the relay coil 3p. The movable contacts 3q, 3t, 3v are brought into contact with the normally open contacts 3r, 3u, 3w.

When the ignition switch 7 is returned to the ON position after the engine starts, the first dimmer lamp D1 and the second dimmer lamp D2 of the headlamp 1, as well as the small lamp 2, are lighted even during the daytime.

The lighting condition of the headlamp 1 and the small lamp 2 is thus controlled by rotating the on-off switch 4 once or twice in a stepwise manner.

Figure 3:
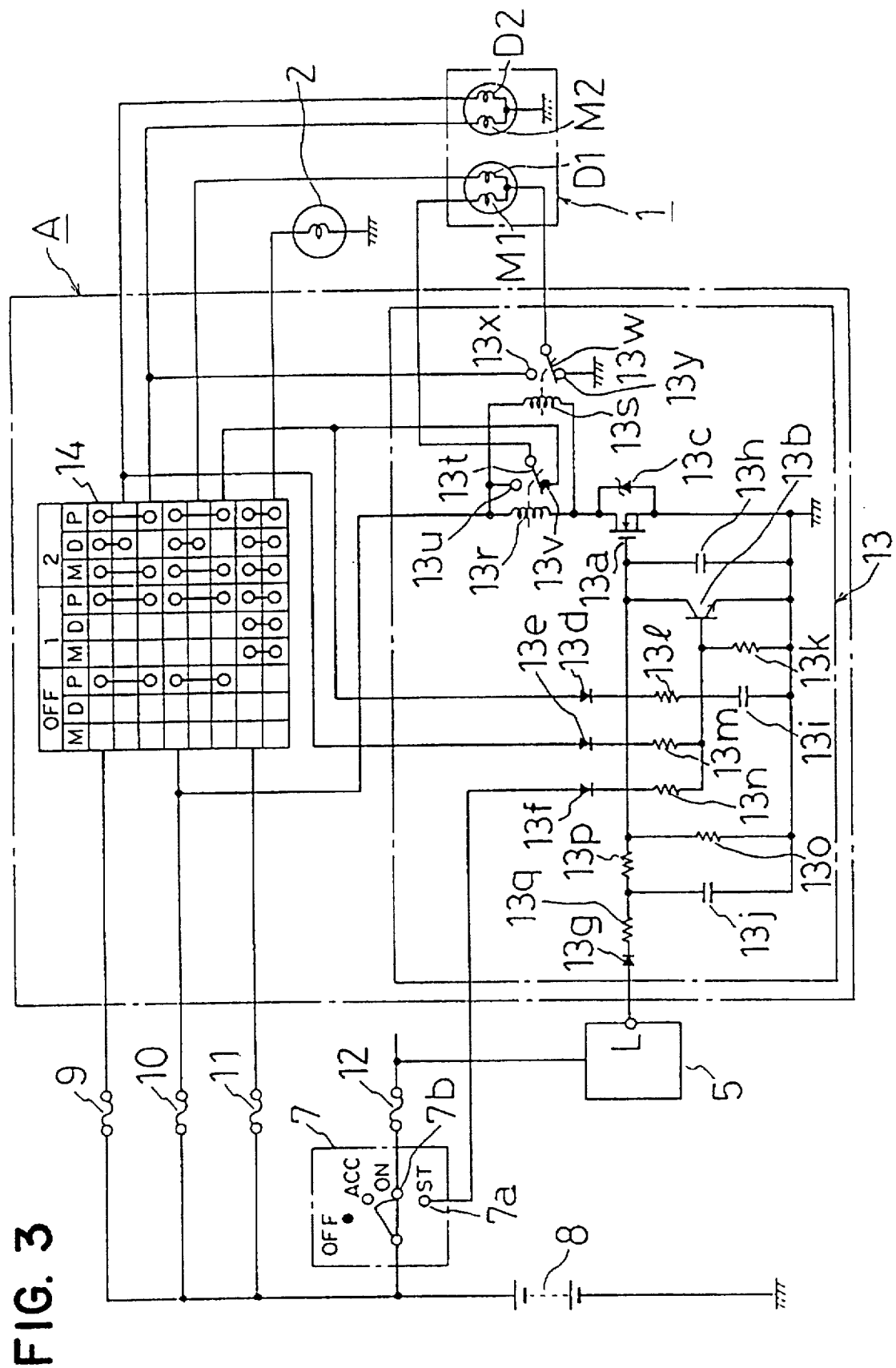
FIG. 3 is a diagram showing a second form of daytime running light control circuit formed in the printed circuit board shown in FIG. 1.

Reference will now be made to the daytime running light control circuit 13, as shown in FIG. 3. This second circuit is of the type that causes the headlamp 1 to be lighted less brightly during daytime than during nighttime. The second daytime running light control circuit 13 is composed of transistors 13a, 13b, a Zener diode 13c, diodes 13d to 13g, capacitors 13h to 13j, resistors 13k to 13q, relay coils 13r, 13s, movable contacts 13t, 13w, normally open contacts 13u, 13x, and normally closed contacts 13v, 13y.

The diode 13f has an anode connected to the engine start contact 7a of the ignition switch 7. The diode 13g has an anode connected to the L terminal of the voltage regulator 5. The relay coils 13r, 13s and the normally open contact 13u are connected to the positive terminal of the direct current power source 8 through the fuse 10. The normally open contact 13x is connected to a point where the on-off switch 14 and the second main lamp M2 are interconnected. The normally closed contact 13v is connected to a point where the on-off switch 14 and the anode of the diode 13d are interconnected. The normally closed contact 13y is grounded. The movable contact 13t is connected to the first main lamp M1. The movable contact 13w is connected to a common terminal of the first main lamp M1 and the first dimmer lamp D1. A point where the diode 13e and the on-off switch 14 are interconnected is connected to the second dimmer lamp D2.

The second circuit 13, as shown in FIG. 3, operates as follows.

Reference will first be made to the state in which the on-off switch 14 is OFF. To start the vehicle engine, the ignition switch 7 is moved from the OFF position to the start position. Then, a base current is caused to flow from the engine start contact 7a of the ignition switch 7 to the transistor 13b of the daytime running light control circuit 13 so as to render the transistor 13b on and the transistor 13a off. No exiting current flows through the relay coils 13r, 13s, and the movable contacts 13t, 13w will in no way be connected to the normally open contacts 13u, 13x.

As such, the headlamp 1 is not lighted when the ignition switch 7 is moved to the start position. The energy generated by the direct current power source 8 is used exclusively to rotate the self starter.

Next, the ignition switch 7 is returned to the ON position after the engine starts. The base current is no longer fed from the engine start contact 7a of the ignition switch 7 to the transistor 13b. The transistor 13b is thus rendered off. The transistor 13a is now free to operate. At this time, the voltage regulator 5 is operable to give a high level of electric potential to the L terminal during starting of the engine. The base current is then fed from the L terminal to the transistor 13a. The transistor 13a is rendered on to cause an exiting current to flow through the relay coils 13r, 13s. The movable contacts 13t, 13w are then brought into contact with the normally open contacts 13u, 13x. As such, the positive terminal of the direct current power source 8, the fuse 10, the normally open contact 13u, the movable contact 13t, the first main lamp M1, the movable contact 13w, the normally open contact 13x, the second main lamp M2, and the negative terminal of the direct current power source 8 collectively form a circuit. Since the first and second main lamps M1, M2 are serially connected, half of the voltage generated by the direct current power source is applied to the first and second main lamps M1, M2, respectively.

When the ignition switch 7 is returned to the ON position after the engine starts, the first and second main lamps M1, M2 of the headlamp 1 are slightly lighted even during daytime.

Next, when the on-off switch 14 is rotated once or twice in a stepwise manner, a base current is caused to flow from the on-off switch 14 to the transistor 13b of the daytime running light control circuit 13 so as to render the transistor 13b on and the transistor 13a off. As a result, no exiting current flows through the relay coils 13r, 13s, and the movable contacts 13t, 13w are separated from the normally open contacts 13u, 13x.

Again, the lighting condition of the headlamp 1 and the small lamp 2 is controlled by rotating the on-off switch 4 once or twice in a stepwise manner.

The present invention is not limited to the illustrated embodiments. Various modifications may be made without departing from the scope of the invention. For example, the lighting switch assembly is not necessarily detachably mounted to the combination switches. The lighting switch assembly as an independent unit may alternatively have an internal daytime running light control circuit. A light control circuit that allows a lamp to be automatically turned on and off in response to the brightness outside of the vehicle, and the daytime running light control circuit may be incorporated into the lighting switch assembly.

This invention as thus far described offers the following advantages.

(1) The invention eliminates the need for wires to provide an electrical connection between the daytime running light control circuit and the lighting switch assembly and, thus, simplifies the wiring arrangement of the vehicle.

(2) The invention reduces the total weight of wires connected to the headlamp.

(3) The invention eliminates the step of mounting the daytime running light control circuit to the vehicle.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lighting switch assembly with an internal daytime running light control circuit, comprising:
   a base attached to a vehicle steering column;
   a lighting switch assembly (A) having on-off switches (4, 14) connected to a headlamp (1);
   a printed circuit board (15) mounted to the lighting switch assembly (A);
   electric elements (16) mounted to the printed circuit board (15) and adapted to form daytime running light control circuits (3, 13), said electric elements (16) being directly connected to said on-off switches (4, 14); and
   means for releasably attaching said lighting switch assembly (A) to said base.

2. A lighting switch assembly with an internal daytime running light control circuit according to claim 1, further comprising a voltage regulator (5) connected to said lighting switch assembly (A) and adapted to produce a voltage as a vehicle engine is rotated.

3. A lighting switch assembly with an internal daytime running light control circuit according to claim 1, further comprising an ignition switch (7) having an engine start contact (7a) connected to said lighting switch assembly (A).

4. A lighting switch assembly with an internal daytime running light control circuit according to claim 1, further comprising an additional switch assembly.

5. A lighting switch assembly with an internal daytime running light control circuit according to claim 4, wherein said additional switch assembly is a turn indicator switch assembly.

6. A lighting switch assembly with an internal daytime running light control circuit according to claim 1, wherein said on-off switches have terminals, and said printed circuit board contacts said terminals to make an electrical connection between said printed circuit board and said terminals.

7. A lighting switch assembly with an internal daytime running light control circuit according to claim 1, further comprising a cover for said on-off switches, wherein said on-off switches have fixed contacts mounted on a switch block, and said switch cover is resiliently fit over the switch block.

8. A lighting assembly with an internal daytime running light control circuit, comprising:
   a base attached to a vehicle steering column;
   a headlamp (1);
   a lighting switch assembly (A) having on-off switches (4, 14) connected to said headlamp (1), said switch assembly further comprising a printed circuit board (15) having a plurality of electric elements (16) mounted thereto, said plurality of electric elements (16) comprising daytime running light control circuits (3, 13), said electric elements (16) being directly connected to said on-off switches (4, 14); and
   means for releasably attaching said lighting switch assembly (A) to said base.

9. The lighting assembly according to claim 8, wherein said on-off switches (4, 14) comprise fixed contacts (20) and movable contacts (21), said fixed contacts being integrally formed with a plurality of terminals (18), and the direct connection between said electric elements (16) and said on-off switches (4, 14) comprising a soldered connection of said terminals (18) contacting an electrically conductive line of said printed circuit board (15).

10. A lighting assembly with an internal daytime running light control circuit according to claim 8, further comprising an additional switch assembly.

11. A lighting assembly with an internal daytime running light control circuit according to claim 10, wherein said additional switch assembly is a turn indicator switch assembly.

12. A lighting assembly with an internal daytime running light control circuit according to claim 8, wherein said on-off switches have terminals, and said printed circuit board contacts said terminals to make an electrical connection between said printed circuit board and said terminals.

13. A lighting assembly with an internal daytime running light control circuit according to claim 8, further comprising a cover for said on-off switches, wherein said on-off switches have fixed contacts mounted on a switch block, and said switch cover is resiliently fit over the switch block.

* * * * *